US012726502B2

(12) United States Patent
Sinks et al.

(10) Patent No.: US 12,726,502 B2
(45) Date of Patent: Sep. 1, 2026

(54) EVENT TO ACTION AND ACTIVITY CORRELATION SYSTEM

(71) Applicant: Bank of America Corporation, Charlotte, NC (US)

(72) Inventors: Steven Sinks, Scottsdale, AZ (US); Joshua Abraham, Sharon, MA (US)

(73) Assignee: Bank of America Corporation, Charlotte, NC (US)

( * ) Notice: Subject to any disclaimer, the term of this patent is extended or adjusted under 35 U.S.C. 154(b) by 38 days.

(21) Appl. No.: 19/062,219

(22) Filed: Feb. 25, 2025

(65) Prior Publication Data

US 2026/0254826 A1 Aug. 27, 2026

(51) Int. Cl.
*H04L 29/06* (2006.01)
*H04L 9/40* (2022.01)

(52) U.S. Cl.
CPC ...... *H04L 63/1425* (2013.01); *H04L 63/1416* (2013.01); *H04L 63/1441* (2013.01)

(58) Field of Classification Search
CPC ............. H04L 63/1425; H04L 63/1416; H04L 63/1441
See application file for complete search history.

(56) References Cited

U.S. PATENT DOCUMENTS 10,922,210 B2 * 2/2021 Richardson ........... G06F 11/302
11,055,405 B1 * 7/2021 Jin ........................ G06F 21/552
11,277,423 B2 3/2022 Brown
2018/0027006 A1 * 1/2018 Zimmermann ..... H04L 63/0227 726/11
2019/0026632 A1 1/2019 Natsumeda
2019/0207969 A1 * 7/2019 Brown .................. G06F 21/552
2020/0285997 A1 * 9/2020 Bhattacharyya ......... G06N 7/01

FOREIGN PATENT DOCUMENTS

EP 3531329 8/2019

* cited by examiner

*Primary Examiner* — Harunur Rashid
(74) *Attorney, Agent, or Firm* — Weiss & Arons LLP

(57) ABSTRACT

Methods may detect, terminate and prevent nefarious actions within a computing network. Methods may mine, track and store a data set comprising patterns of normal user activity. Normal user activity may include login times, data access requests per unit time and self-generated network traffic volume per unit time. Methods may create a frequency baseline corresponding to a pattern of normal activity for each user. Methods may monitor the system for deviations in access frequency within the established baseline. Upon identification of deviations, methods may create a security incident and/or electronically relocate a user associated with the security incident within a secured sandbox environment.

15 Claims, 6 Drawing Sheets

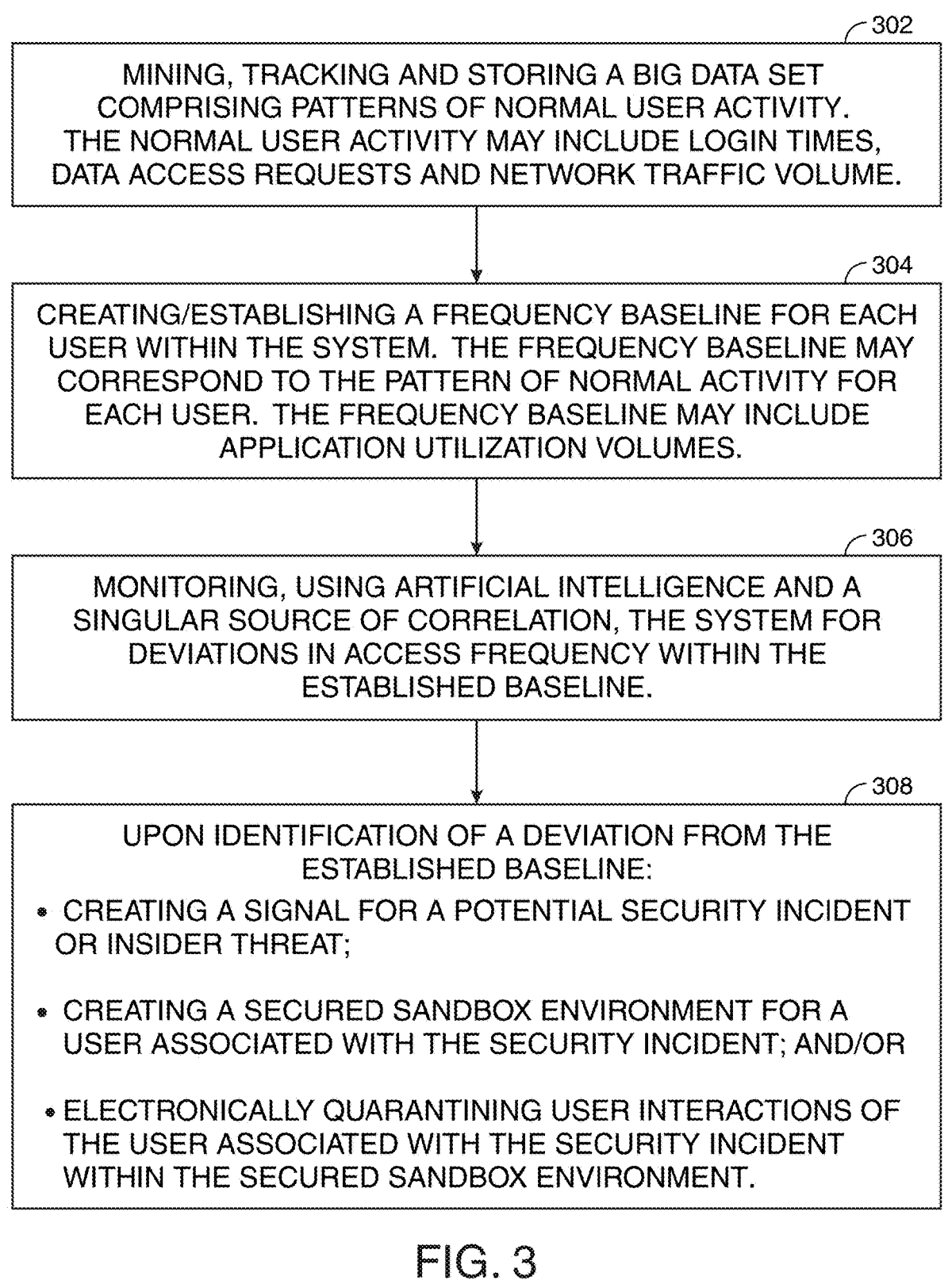

302

MINING, TRACKING AND STORING A BIG DATA SET COMPRISING PATTERNS OF NORMAL USER ACTIVITY. THE NORMAL USER ACTIVITY MAY INCLUDE LOGIN TIMES, DATA ACCESS REQUESTS AND NETWORK TRAFFIC VOLUME.

304

CREATING/ESTABLISHING A FREQUENCY BASELINE FOR EACH USER WITHIN THE SYSTEM. THE FREQUENCY BASELINE MAY CORRESPOND TO THE PATTERN OF NORMAL ACTIVITY FOR EACH USER. THE FREQUENCY BASELINE MAY INCLUDE APPLICATION UTILIZATION VOLUMES.

306

MONITORING, USING ARTIFICIAL INTELLIGENCE AND A SINGULAR SOURCE OF CORRELATION, THE SYSTEM FOR DEVIATIONS IN ACCESS FREQUENCY WITHIN THE ESTABLISHED BASELINE.

308

UPON IDENTIFICATION OF A DEVIATION FROM THE ESTABLISHED BASELINE:

- CREATING A SIGNAL FOR A POTENTIAL SECURITY INCIDENT OR INSIDER THREAT;
- CREATING A SECURED SANDBOX ENVIRONMENT FOR A USER ASSOCIATED WITH THE SECURITY INCIDENT; AND/OR
- ELECTRONICALLY QUARANTINING USER INTERACTIONS OF THE USER ASSOCIATED WITH THE SECURITY INCIDENT WITHIN THE SECURED SANDBOX ENVIRONMENT.

FIG. 3

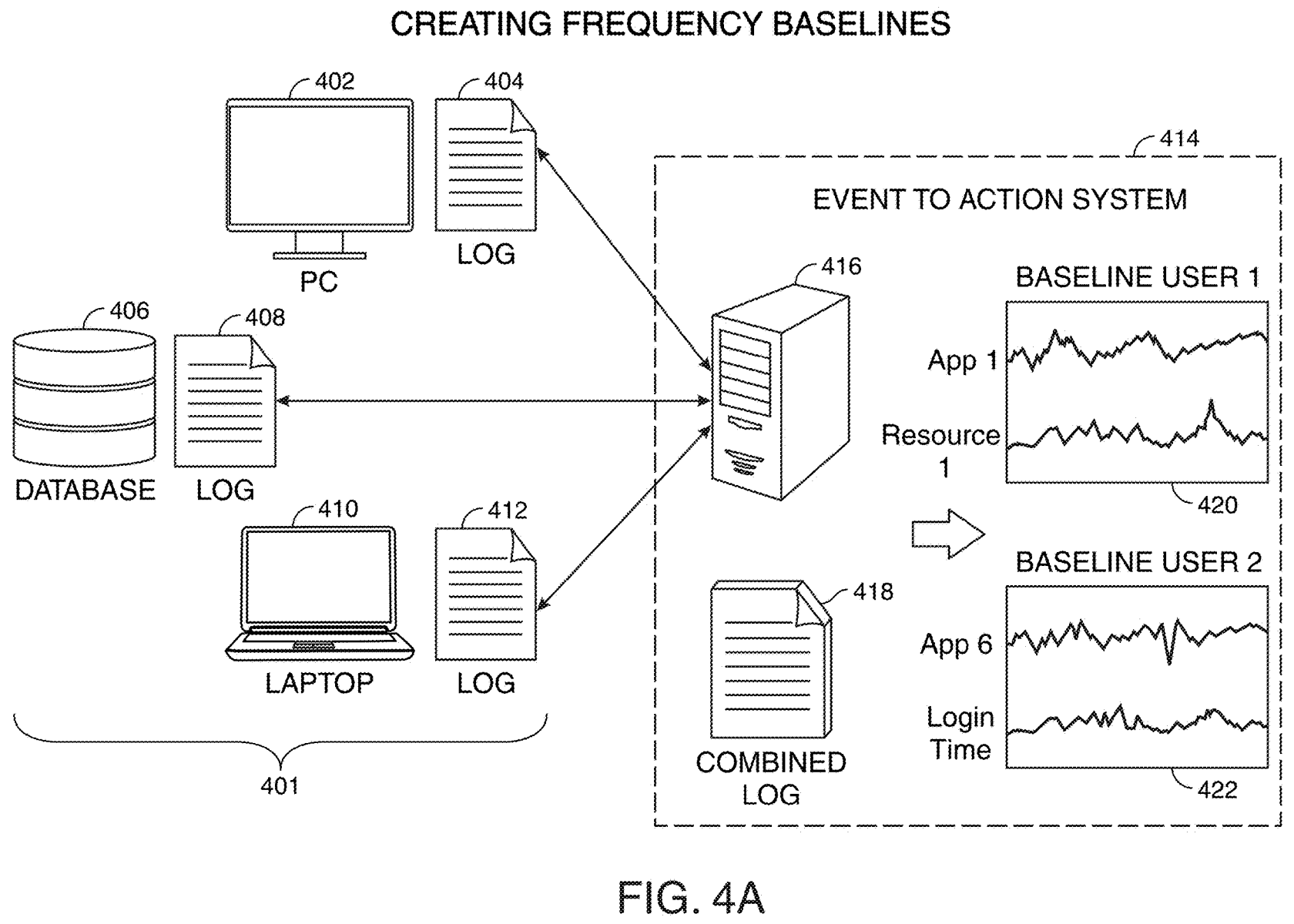

CREATING FREQUENCY BASELINES

402
PC
404
LOG
406
DATABASE
408
LOG
410
LAPTOP
412
LOG
401
414
EVENT TO ACTION SYSTEM
416
418
COMBINED LOG
BASELINE USER 1
App 1
Resource 1
420
BASELINE USER 2
App 6
Login Time
422

FIG. 4A

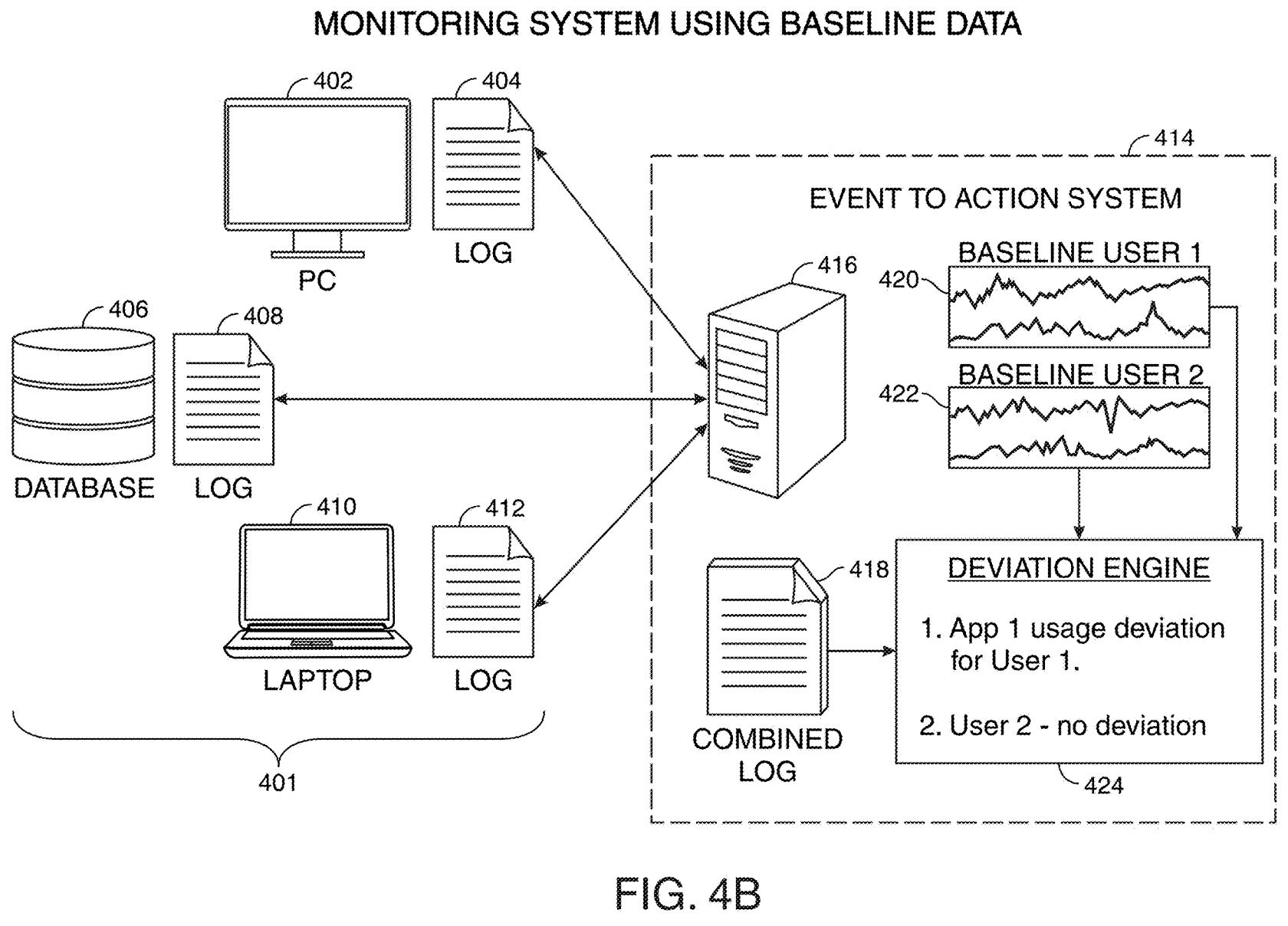

MONITORING SYSTEM USING BASELINE DATA

402
PC
404
LOG
406
DATABASE
408
LOG
410
LAPTOP
412
LOG
401

414
EVENT TO ACTION SYSTEM
416
418
COMBINED LOG
420
BASELINE USER 1
422
BASELINE USER 2
424
DEVIATION ENGINE
1. App 1 usage deviation for User 1.
2. User 2 - no deviation

FIG. 4B

EVENT TO ACTION AND ACTIVITY CORRELATION SYSTEM

FIELD OF TECHNOLOGY

Aspects of the disclosure relate to fraud and threat detection.

BACKGROUND OF THE DISCLOSURE

The cybersecurity industry has grown significantly in recent years. Cybersecurity systems utilize both hardware and software to protect data and information stored on computer networks. Conventional cybersecurity systems focus on gatekeeping entry points to both software applications and hardware locations.

However, once a user of malicious intent has penetrated the safeguards protecting an application, current cybersecurity solutions are incapable of detecting nefarious activity. Because current cybersecurity solutions are incapable of detecting nefarious activity, when a user of malicious intent utilizes known applications or network-approved solutions, current cybersecurity solutions do not provide a mechanism for identifying, within the known applications, the user of malicious intent. Furthermore, current cybersecurity solutions do not provide a mechanism for halting, within the known applications, activities of such a user.

As such, it would be desirable to provide a system that detects nefarious activities and identifies perpetrators operating within a computer network firewall.

It would be further desirable for such a system to prevent execution of the nefarious activities.

SUMMARY OF THE DISCLOSURE

Systems, apparatus and methods for detecting, terminating and preventing nefarious actions within a computing network is provided. The computing network may include a hardware processor and a hardware memory.

Methods may include mining, tracking and storing a big data set. The big data set may include patterns of normal user activity. The normal user activity may include login times, data access requests per unit time and/or self-generated network traffic volume per unit time.

Methods may include creating and/or establishing a frequency baseline for each user within the system. The frequency baseline may correspond to a pattern of normal activity for each user. The frequency baseline may include network and application utilization volumes.

Methods may include monitoring the system for deviations in access frequency within the established frequency baseline. The monitoring may involve artificial intelligence and a singular source of correlation. The deviations may include atypical spikes/declines in file use, atypical spikes/declines in application use, anomalies including utilization occurring at irregular times and anomalies including utilization occurring across geographically distant locations in a less than a predetermined time period.

The deviations from the established baseline may include a significantly greater than the baseline access frequency to sensitive files within the computing network. The deviations may also include anomalous baseline login locations. The deviations may also include unusual spending patterns. The unusual spending patterns may include sudden increases in specific spending categories. The unusual spending patterns may include repeated transactions of less than a predetermined transaction amount. The deviations may include greater than a predetermined number of login attempts. The deviations may classify an account associated with the predetermined number of login attempts as a compromised account. The deviations may include a quantity of transactions or quality of transactions that are greater than and/or less than abnormal user activity, abnormal withdrawal activity and/or abnormal deposit activity.

Upon identification of one or more of the deviations, methods may include creating a signal for a potential security incident or insider threat. Methods may also include electronically relocating a user associated with the security incident within a secured sandbox environment. At times, methods may completely terminate all electronic communications of the user within the sandbox environment.

In certain embodiments, the secured sandbox environment may provide a holding environment for the user. As such, the user may be able to perform non-secure, or level one activities or executables, however, the user may be unable to perform secure, or level two activities or executables. Non-secure activities may include accessing files, and/or servers, labeled non-secure, while secure activities may include accessing files, and/or servers, labeled secure. In certain embodiments, level one activities may be activities may be activities that are enabled between external entity parties and internal entity parties, while level two activities may be activities that are only enabled between internal entity parties.

In certain embodiments, methods may include electronically translating the baseline frequency into a baseline frequency trendline for a first user within the plurality of users. Methods may also include electronically translating current usage of first user (such as, application usage and resource usage) into a current frequency trendline. Methods may also include electronically comparing the current frequency trendline to the baseline frequency trendline to confirm the deviations for the first user.

BRIEF DESCRIPTION OF THE DRAWINGS

The objects and advantages of the invention will be apparent upon consideration of the following detailed description, taken in conjunction with the accompanying drawings, in which like reference characters refer to like parts throughout and in which:

FIG. 3 shows an illustrative flow chart in accordance with principles of the disclosure; and FIGS. 4A, 4B and 4C shows illustrative diagrams in accordance with principles of the disclosure.

DETAILED DESCRIPTION OF THE DISCLOSURE

Figure 1:
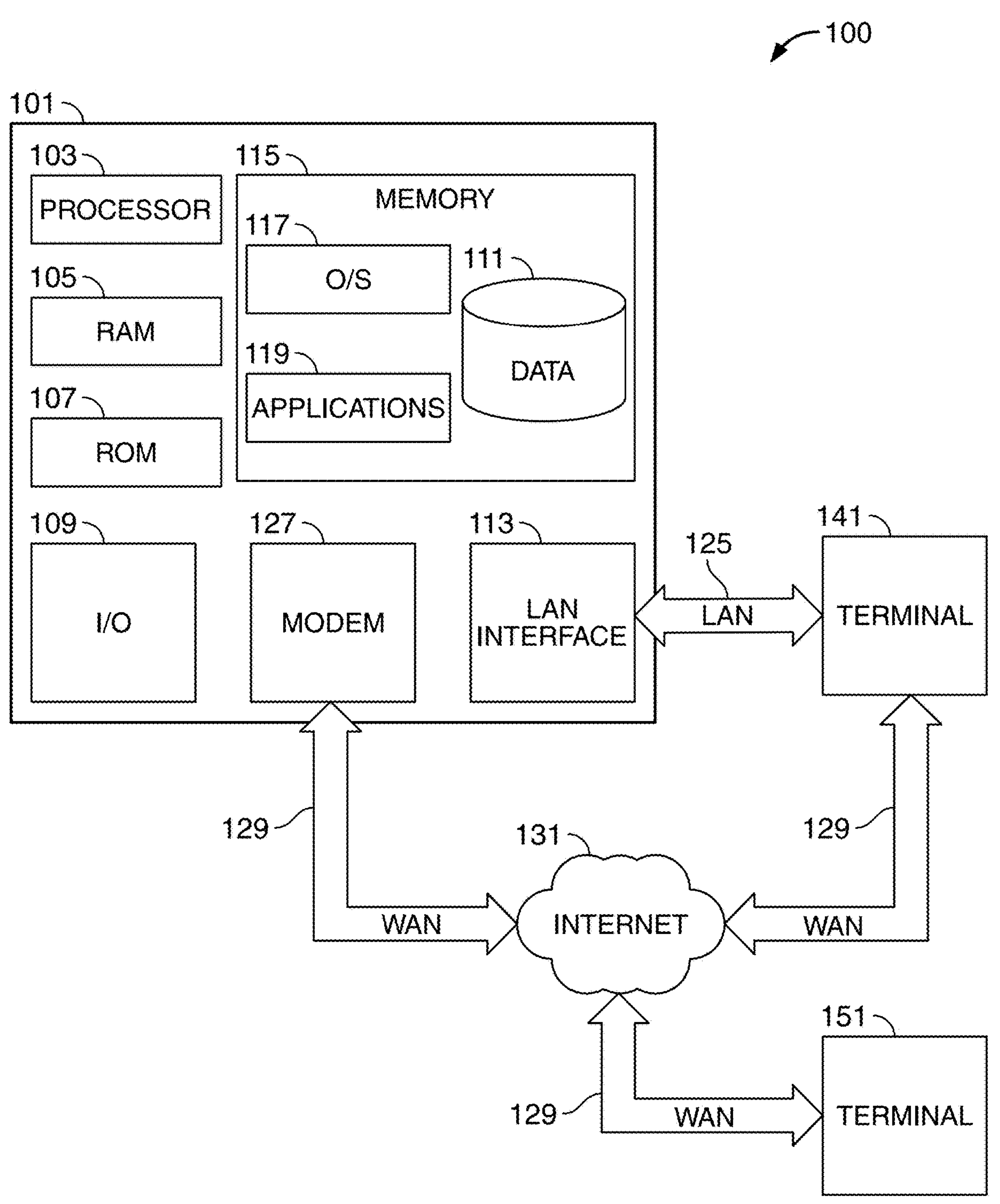
FIG. 1 shows an illustrative diagram in accordance with principles of the disclosure.

Systems, apparatus and methods for detecting, terminating and preventing nefarious actions within a computing network is provided. Systems may include a hardware memory and a hardware processor.

The hardware processor may be operable to mine a continually updating big data set. The continually updating big data set may include patterns of normal user activity pertaining to a plurality of users. The normal user activity may include user login times, user data access requests per unit time and/or user self-generated network traffic volume per unit time.

The hardware processor may track, from the big data set, for each user included in the plurality of users, a pattern of tracked normal user activity pertaining to the user. Based on the tracking, the hardware processor may create a frequency baseline for each user. The frequency baseline may be dynamically updating. The frequency baseline may correspond to the pattern of tracked normal user activity. The frequency baseline may include spikes and declines in application utilization volume. The frequency baseline may include spikes and declines in file use. The frequency baseline may include spikes and declines in geographic locations of resource utilization. The frequency baseline may include time ranges of application utilization. The frequency baseline may include time ranges of file use.

The hardware processor may continually monitor each user's usage within the continually updating big data set for deviations in frequencies between each user's established baseline and each user's continually monitored usage within the continually updating big data set. The deviations may include atypical spikes/declines in file use, atypical spikes/declines in application use, anomalies including utilization occurring at irregular times and/or anomalies including utilization occurring across geographically distant locations in a less than a predetermined time period.

The atypical spikes/declines in application use may be identified for each user by electronically comparing a baseline frequency trendline, translated from the baseline frequency of each user, to a current frequency trendline, translated from a current usage of each user.

The deviations from the established baseline may include a significantly greater than the baseline access frequency to sensitive files within the computing network. The deviations may also include anomalous baseline login locations. The deviations may also include unusual spending patterns. The unusual spending patterns may include sudden increases in specific spending categories. The unusual spending patterns may include repeated transactions of less than a predetermined transaction amount. The deviations may include greater than a predetermined number of login attempts. The deviations may classify an account associated with the predetermined number of login attempts as a compromised account. The deviations may include a quantity of transactions or quality of transactions that are greater than and/or less than abnormal user activity, abnormal withdrawal activity and/or abnormal deposit activity.

The monitoring may utilize artificial intelligence and a singular source of correlation. The system may serve as a singular source of correlation that may monitor all of a user's interactions across multiple devices.

The system may identify one or more greater than threshold deviations from the frequency baseline for a first user included in the plurality of users. Upon such identification, the system may create a sandbox environment for the first user. The sandbox environment may prevent the first user from accessing data, within the computing network, labeled above a threshold security level.

Illustrative method steps may be combined. For example, an illustrative method may include steps shown in connection with another illustrative method.

The steps of methods may be performed in an order other than the order shown or described herein. Embodiments may omit steps shown or described in connection with illustrative methods. Embodiments may include steps that are neither shown nor described in connection with illustrative methods.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server," or a "computing device." Computer 101 may be a workstation, desktop, laptop, tablet, smartphone and/or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may include processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute software running on the computer. Other components commonly used for computers, such as EEPROM or flash memory or any other suitable components, may also be part of computer 101.

Memory 115 may include any suitable permanent storage technology, such as a hard drive. Memory 115 may store software including the operating system 117 and application program(s) 119 along with any data 111 needed for the operation of the system 100. Memory 115 may also store videos, text and/or audio assistance files. The data stored in memory 115 may also be stored in cache memory and/or any other suitable memory.

I/O module 109 may include connectivity to a microphone, keyboard, touch screen, mouse and/or stylus through which input may be provided into computer 101. The input may include input relating to cursor movement. The input/output module may also include one or more speakers for providing audio output and a video display device for providing textual, audio, audiovisual and/or graphical output. The input and output may be related to computer application functionality.

System 100 may be connected to other systems via a local area network ("LAN") interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include LAN 125 and a wide area network ("WAN") 129 but may also include other networks. When used in a LAN networking environment, computer 101 may connect to LAN 125 through LAN interface 113 or an adapter. When used in a WAN networking environment, computer 101 may include modem 127 or other means for establishing communications over WAN 129, such as Internet 131.

It will be appreciated if the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface ("API"). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory and/or any other suitable memory.

Additionally, application program(s) 119, which may be used by computer 101, may include computer executable instructions for invoking functionality related to communication, such as e-mail, Short Message Service ("SMS"), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered for the purposes of this application, as engines with respect to the performance of the particular tasks to which the programs are assigned.

Computer 101 and/or terminals 141 and 151 may also include various other components, such as a battery, speaker and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
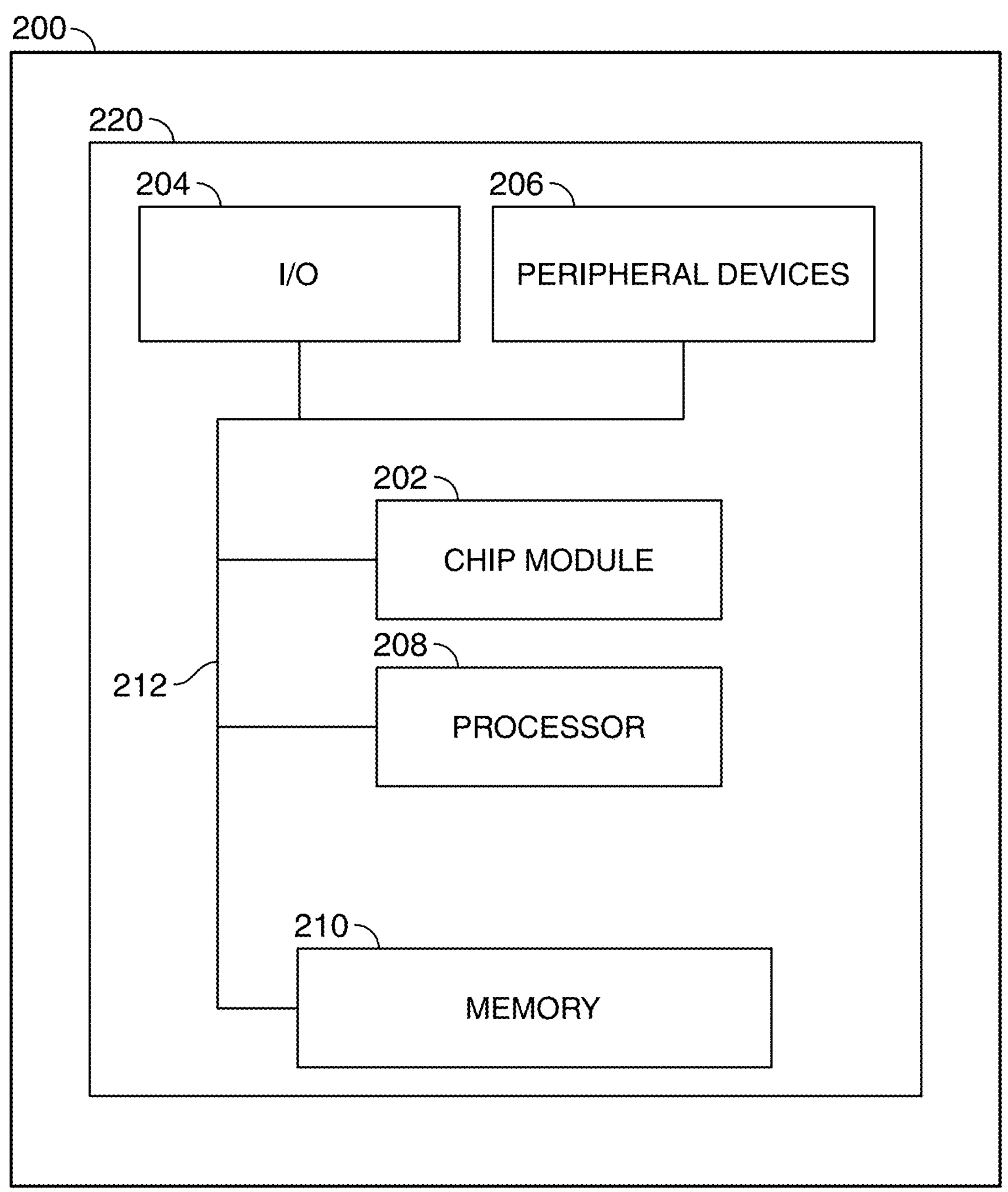
FIG. 2 shows another illustrative diagram in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 1. Apparatus 200 may include chip module 202, which may include one or more integrated circuits, and which may include logic configured to perform any suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208, and 210 may be coupled together by a system bus or other interconnections 212 and may be present on one or more circuit boards such as circuit board 220. In some embodiments, the components may be integrated into a single chip. The chip may be silicon-based.

FIG. 3 shows an illustrative flow chart. Step 302 shows mining, tracking and storing a big data set comprising patterns of normal user activity. The normal user activity may include login times, data access requests and network traffic volume.

Step 304 shows creating and/or establishing a frequency baseline for each user within the system. The frequency baseline may correspond to the pattern of normal activity for each use. The frequency baseline may include application utilization volumes.

Step 306 shows monitoring, using artificial intelligence and a singular source of correlation, the system for deviations in access frequency within the established frequency baseline.

Step 308 shows upon identification of a deviation from the established baseline, creating a signal for a potential security incident or insider threat, creating a secured sandbox environment for a user associated with the security incident and/or electronically quarantining user interactions of the user associated with the security incident within the secured sandbox environment.

Figure 4C:
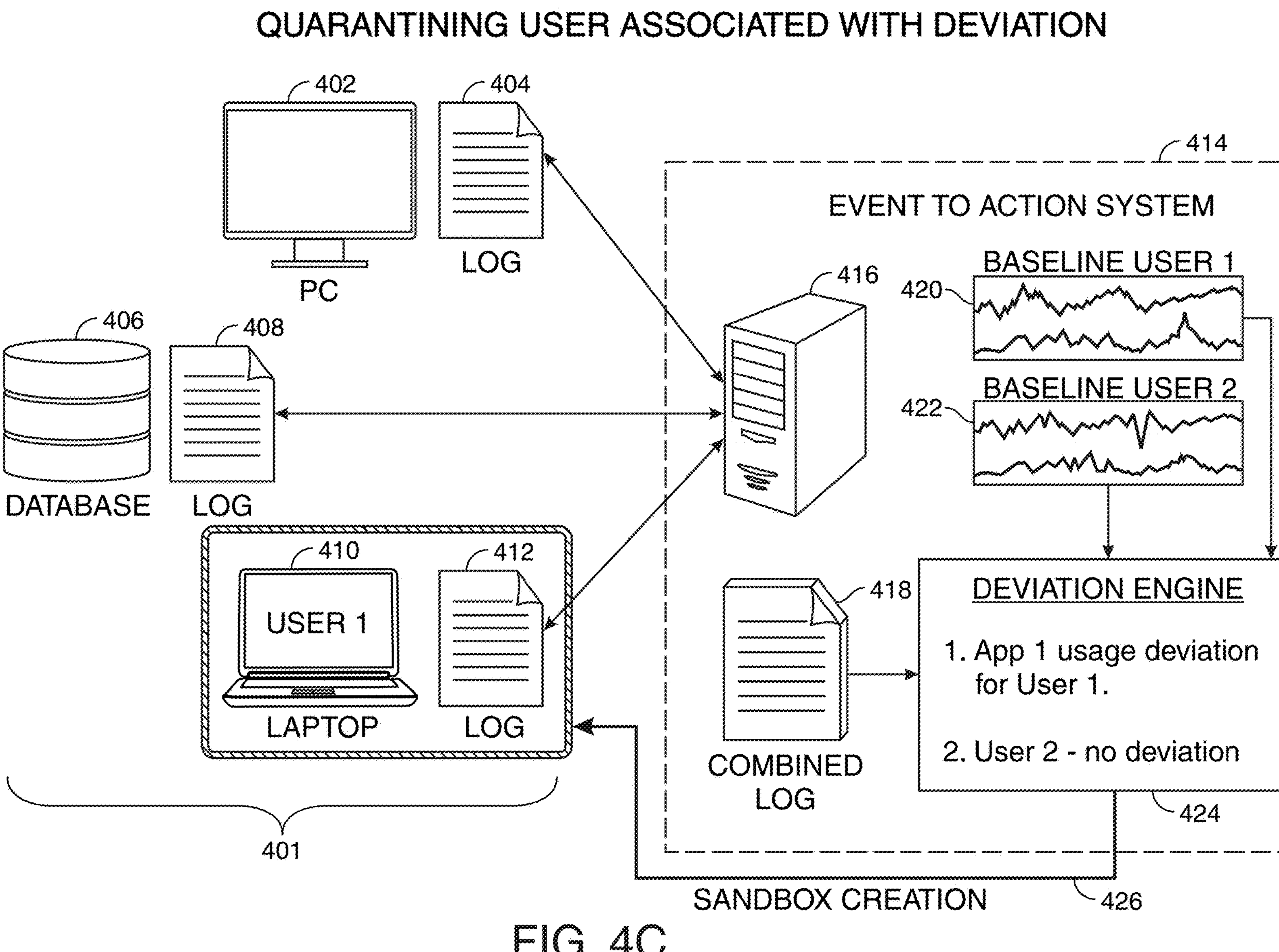

FIGS. 4A, 4B and 4C show illustrative diagrams.

FIG. 4A shows creating a frequency baseline within a computing network.

Computing network 401 may include database 406, PC 402 and laptop 410.

Database 406 may produce log 408 which may include the computing communications and executions that occurred within database 406. PC 402 may produce log 404 which may include the computing communications and executions that occurred within PC 402. Laptop 410 may produce log 412 which may include the computing communications and executions that occurred within laptop 410.

Event to action system 414 may include server 416. Server 416 may monitor the communications and executions that occur within computing network 401. As such, server 416 may communicate with database 406, PC 402 and/or laptop 410 and the associated logs (log 404, log 408 and log 410). Server 416 may combine data from each of logs 404, 408 and 410 into a combined log, shown at 418.

Using combined log 418, event to action system 414 may generate a baseline for each user. As such, baseline for user 1 may be generated, as shown at baseline 420. Baseline 420 may include frequencies of application usage, frequencies of resource usage and other suitable frequency data. Baseline for user 2 may be generated, as shown at baseline 422. Baseline 422 may include frequencies of application usage, frequencies of resource usage and other suitable frequency data.

FIG. 4B shows a monitoring system using baseline data. Event to action system may include deviation engine 424. Deviation engine 424 may determine deviations between stored baselines and currently identified usage information. As shown, deviation engine 424 may determine that the usage of application 1 by user 1 has significantly deviated from the stored baseline for user 1. Deviation engine 424 may also determine that no deviations have been identified for user 2.

FIG. 4C shows a quarantining a user associated with a deviation.

Upon identification that user 1 has deviated from a baseline, a sandbox may be created for user 1. As such, deviation engine may quarantine, as shown at 426, user 1 associated with laptop 10. The quarantine and or sandbox creation may prevent user 1 from accessing secure information within network 401.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Thus, methods and apparatus for an event to action and activity correlation system are provided. Persons skilled in the art will appreciate that the present disclosure can be practiced by other than the described embodiments, which are presented for purposes of illustration rather than of limitation and that the present disclosure is limited only by the claims that follow.

What is claimed is:

1. A method for detecting, terminating and preventing nefarious actions within a computing network, said computing network comprising a hardware processor and a hardware memory, the method comprising:

mining, tracking and storing a big data set comprising patterns of normal user activity, said normal user activity comprising login times, data access requests per unit time and self-generated network traffic volume per unit time;

creating/establishing a frequency baseline for each user within the system, the frequency baseline corresponding to a pattern of normal activity for each user, said frequency baseline comprising network and application utilization volumes;

monitoring, using artificial intelligence and a singular source of correlation, the system for deviations in access frequency within the established baseline, the deviations comprising:

atypical spikes/declines in file use;

atypical spikes/declines in application use;

anomalies including utilization occurring at irregular times;

anomalies including utilization occurring across geographically distant locations in a less than a predetermined time period;

upon identification of one or more of the deviations comprising atypical spikes/declines in file use, atypical spikes/declines in application use, anomalies including utilization occurring at irregular time and anomalies including utilization occurring across geographically distant locations in less than a predetermined time period, creating a signal for a potential security incident or insider threat;

in response to creating the signal, electronically relocating a user associated with the security incident within a secured sandbox environment; and for a first user within the plurality of users:

electronically translating the baseline frequency into a baseline frequency trendline; and electronically translating current usage of first user into a current frequency trendline;

electronically comparing the current frequency trendline to the baseline frequency trendline to confirm the deviations for the first user;

wherein the deviations from the established baseline further comprise a significantly greater than the baseline access frequency to sensitive files.

2. The method of claim 1 wherein the deviations from the established baseline further comprises anomalous baseline login locations.

3. The method of claim 1 wherein the deviations from the established baseline further comprises detecting unusual spending patterns.

4. The method of claim 3 wherein the unusual spending patterns include sudden increases in specific spending categories.

5. The method of claim 3 wherein the unusual spending patterns include repeated transactions of less than a predetermined transaction amount.

6. The method of claim 3 wherein:

the deviations from the established baseline further comprise greater than a predetermined number of login attempts; and the deviations from the established baseline classify an account associated with the predetermined number of login attempts as a compromised account.

7. The method of claim 3 wherein the deviations from the established baseline further comprises a quantity of transactions or quality of transactions that are greater than and/or less than abnormal user activity, abnormal withdrawal activity and/or abnormal deposit activity.

8. A system for detecting, terminating and preventing nefarious actions within a computing network, the system comprising:

a hardware memory; and a hardware processor, the hardware processor operable to:

mine a continually updating big data set comprising patterns of normal user activity pertaining to a plurality of users, said normal user activity comprising user login times, user data access requests per unit time and user self-generated network traffic volume per unit time;

track, from the big data set, for each user included in the plurality of users, a pattern of tracked normal user activity pertaining to the user;

create a frequency baseline for each user, the frequency baseline corresponding to the pattern of tracked normal user activity, said frequency baseline comprising:

spikes and declines in application utilization volume;

spikes and declines in file use;

spikes and declines in geographic locations of resource utilization;

time ranges of application utilization; and time ranges of file use;

continually monitor, using artificial intelligence and a singular source of correlation, each user's usage within the continually updating big data set for deviations in frequencies between each user's established baseline and each user's continually monitored usage within the continually updating big data set;

upon identification of one or more greater than threshold deviations from the frequency baseline for a first user included in the plurality of users, creating a sandbox environment for the first user, said sandbox environment preventing the first user from accessing data labeled above a threshold security level;

wherein the atypical spikes/declines in application use are:

identified for each user by electronically comparing a baseline frequency trendline, translated from the baseline frequency of each user, to a current frequency trendline, translated from a current usage of each user; and wherein the deviations from the established baseline further comprise a significantly greater than the baseline access frequency to sensitive files.

9. The system of claim 8, wherein the deviations comprise:

atypical spikes/declines in file use;

atypical spikes/declines in application use;

anomalies including utilization occurring at irregular times; and anomalies including utilization occurring across geographically distant locations in a less than a predetermined time period.

10. The system of claim 9 wherein the deviations further comprise anomalous baseline login locations.

11. The system of claim 9 wherein the deviations further comprise unusual spending patterns.

12. The system of claim 11 wherein the unusual spending patterns includes sudden increases in specific spending categories.

13. The system of claim 11 wherein the unusual spending patterns include repeated transactions of less than a predetermined transaction amount.

14. The system of claim 11 wherein:

the deviations further comprise greater than a predetermined number of login attempts; and the deviations classify an account associated with the predetermined number of login attempts as a compromised account.

15. The system of claim 11 wherein the deviations further comprise a quantity of transactions or quality of transactions that are greater than and/or less than abnormal user activity, abnormal withdrawal activity and/or abnormal deposit activity.

* * * * *